United States Patent
Snyder et al.

(10) Patent No.: US 7,837,973 B2
(45) Date of Patent: Nov. 23, 2010

(54) HYDROGEN PRODUCTION METHOD

(75) Inventors: Gregory David Snyder, Macungie, PA (US); Stephen Paul DiMartino, Sr., Schnecksville, PA (US); David Anthony Zagnoli, Macungie, PA (US); James Joseph Stango, Coopersburg, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 823 days.

(21) Appl. No.: 11/745,706

(22) Filed: May 8, 2007

(65) Prior Publication Data

US 2008/0279763 A1  Nov. 13, 2008

(51) Int. Cl.
 *C01B 3/24* (2006.01)
(52) U.S. Cl. .................... 423/650; 423/644; 48/61; 48/197 R; 48/210
(58) Field of Classification Search ............... 423/644, 423/650; 48/61, 197 R, 210
See application file for complete search history.

(56) References Cited

U.S. PATENT DOCUMENTS

| | | | |
|---|---|---|---|
| 4,118,204 A | 10/1978 | Eakman et al. | |
| 4,322,389 A | 3/1982 | Schmid | |
| 4,328,006 A | 5/1982 | Muenger | |
| 4,833,171 A * | 5/1989 | Sweeney | 518/703 |
| 4,959,080 A | 9/1990 | Sternling | |
| 5,152,976 A | 10/1992 | Fong et al. | |
| 5,281,243 A | 1/1994 | Leininger | |
| 2002/0073845 A1 * | 6/2002 | Reddy | 95/96 |
| 2002/0155062 A1 | 10/2002 | Lightner | |
| 2005/0144961 A1 | 7/2005 | Colibaba-Evulet et al. | |

FOREIGN PATENT DOCUMENTS

| | | |
|---|---|---|
| DE | 3242206 C2 | 5/1984 |
| EP | 0 283 171 A1 | 9/1988 |
| EP | 1 219 566 A1 | 7/2002 |
| GB | 2 078 251 A | 1/1982 |

(Continued)

OTHER PUBLICATIONS

S. Patel, "Canadian oil sands: Opportunities, technologies and challenges," Hydrocarbon Processing, Feb. 2007, pp. 65-73.

(Continued)

*Primary Examiner*—Stanley Silverman
*Assistant Examiner*—Paul A Wartalowicz
(74) *Attorney, Agent, or Firm*—Bryan C. Hoke, Jr.

(57) ABSTRACT

A hydrogen production method that integrates a catalytic steam reformer and a gasifier. Hydrogen is generated in a catalytic steam reformer at a high production rate or design capacity. The catalytic steam reformer is then turned down to a fraction of design capacity while a gasifier produces the needed hydrogen. During the turned down state of the catalytic steam reformer, more of a hydrogen-containing stream formed from gasifier effluent is fed to the catalytic steam reformer as a feed thereby reducing the flow rate of feedstock required for the catalytic steam reformer in the turned down state. Optionally, hydrogen mixtures from the catalytic steam reformer and gasifier are fed to one or more adsorbers for hydrogen purification and adsorber effluent is fired as fuel in the steam reformer furnace to provide a majority of the heat needed for the reforming reaction.

14 Claims, 1 Drawing Sheet

FOREIGN PATENT DOCUMENTS

WO         9955618         5/2007

OTHER PUBLICATIONS

D. Vartivarian and H. Andrawis, "Delayed coking schemes are most economical for heavy-oil upgrading," Oil & Gas Journal, Feb. 13, 2006, pp. 52-56.

Petro-Canada Oil Sands Inc., Application for Approval of Fort Hills Sturgeon Upgrader, vol. 1, Project Description, Section 2 Processing Facilities, Dec. 2006.

Ravikumar, R., et al; "Impact of Carbon Tax on Hydrogen/CO2/Electricity Co-Production for Gasification Plants Compared to Natural Gas Based Combined Cycle and Hydrogen Plants"; Fluor Corporation (Gasification Technologies 2002 Conference); 2002; pp. 1-23; XP002491703.

Furimsky, E.; "Gasification of Oil Sank Coke: Review"; Fuel Processing Technology; 1998; pp. 263-290; XP002491704.

Dong, Y., et al; "Hynol—an Economical Process for Methanol Production from Biomass and Natural Gas with Reduced CO2 Emission"; International Journal of Hydrogen Energy, Elsevier Science Publishers B.V., Barking, GB; vol. 22, No. 10-11; Oct. 11, 1997; pp. 971-977; XP004094832.

\* cited by examiner

HYDROGEN PRODUCTION METHOD

BACKGROUND

The present invention relates generally to hydrogen production and more specifically to a method for producing hydrogen from catalytic steam reformers and gasifiers.

Upgrading of heavy oil into more valuable products usually requires large quantities of hydrogen. Traditionally, this hydrogen is generated by catalytically reacting natural gas and steam in a so-called steam-methane reformer (SMR). More recently, refiners engaged in upgrading projects are considering gasification of petroleum coke or heavy oil as a more cost effective means for generating the large quantities of hydrogen required. This is being driven by the increased cost of natural gas compared to the low cost of a gasifier feedstock.

In steam-methane reforming, natural gas or other suitable feedstock is mixed with an appropriate amount of process steam and heated as it flows through catalyst filled tubes contained within the steam-methane reformer furnace. In the reformer tubes, a portion of the process steam and most of the natural gas feed is converted to synthesis gas (syngas), which contains primarily hydrogen, carbon monoxide and unreacted steam along with lesser amounts of carbon dioxide and unreacted methane.

The hot synthesis gas stream from the reformer tubes is cooled to recover valuable waste heat, which is used to preheat the feed and to generate steam needed for the steam reforming process. In the cooling operation, the reformer effluent is generally passed over one or more beds of water-gas shift catalyst to convert most of the carbon monoxide contained in the synthesis gas to additional hydrogen and carbon dioxide. The synthesis gas is cooled to near ambient temperatures to condense unreacted excess steam so that it can be separated from the raw hydrogen stream prior to sending the stream to a pressure swing adsorption unit (PSA) for product purification.

The PSA produces a purified hydrogen product stream and a PSA desorption effluent or tail gas stream. The tail gas contains unrecovered hydrogen along with other impurities contained in the PSA feed, including carbon monoxide, carbon dioxide, methane and nitrogen. This tail gas stream is typically fired as fuel in the steam reformer furnace to provide the majority of the heat needed to drive the endothermic reforming reaction. Additional heat is provided by also firing a supplemental fuel such as natural gas or refinery fuel gas. The hot flue gas generated in the steam reforming furnace is also cooled to recover waste heat used for preheating steam reformer feed, generating steam and preheating combustion air.

In gasification processes, a suitable hydrocarbon feedstock such as coal, petroleum coke or heavy oil is prepared and fed to one or more gasifiers. In the gasifier vessel, the feedstock is heated and reacted with oxygen to generate a syngas containing predominantly carbon monoxide and hydrogen with lesser amounts of methane, carbon dioxide, nitrogen, argon, steam and sulfur compounds. The gasifier effluent can be quenched via direct injection of water or can be cooled by generating steam in heat recovery equipment.

Since the gasifier effluent contains a significant amount of carbon monoxide, the synthesis gas stream is passed over multiple beds of sulfur-tolerant shift catalyst to convert a portion of the carbon monoxide to hydrogen via the water-gas shift reaction.

Additional waste heat generated by the exothermic shift reaction is recovered in the shift section. The shifted synthesis gas is then routed to an acid gas removal unit (AGR) for removal of sulfur and carbon dioxide contained in the synthesis gas. The raw hydrogen stream from the acid gas removal unit is fed to a PSA for purification of the hydrogen product.

Alternatively, the acid gas removal unit may remove the sulfur compounds, followed by a water-gas shift, followed by either a $CO_2$ removal AGR and a PSA.

There has been much activity recently related to expansion of the Canadian oil sands operations, primarily to upgrade the bitumen or heavy oil contained in the oil sands to a more valuable synthetic crude oil. Since the upgrading process usually consumes large quantities of hydrogen, refiners must choose between the steam reforming process or the gasification process as the means to produce the hydrogen.

In the Fort Hill Sturgeon Upgrader project by Petro-Canada Oil Sands Inc., the refiner is planning on installing steam reformers fed with natural gas to provide a reliable supply of hydrogen for the initial phase(s) of the expansion as discussed in the Application for Approval of Fort Hills Sturgeon Upgrader, Vol. 1, Project Description, Section 2 Processing Facilities, subsection 2.5.2.7 Gasification Unit, Dec. 2006. As the expansion progresses to subsequent phases and heavy oil, asphaltene or petroleum coke becomes available, the refiner plans to install gasifiers to supply essentially all of the hydrogen required for the full expansion. The steam reformer hydrogen plant constructed in Phase 1 will be operated at minimum throughput to reduce the import of natural gas. The Gasification unit will provide the remainder of the total 410,000 $Nm^3/h$ hydrogen during Phases 2 and 3. During periods of gasification unit maintenance outages and other operation interruptions, the steam reformer hydrogen plant will be ramped up to meet the hydrogen demand, which will eliminate the need for a spare gasification unit train. The gasification unit allows for potential future $CO_2$ recovery and sequestration.

The problem of operating the catalytic steam reformer even at deep turndown is that it will continue to consume costly feedstock such as natural gas.

It would be desirable to reduce the consumption of catalytic steam reformer feedstock and/or feedstock used as fuel during turndown and/or deep turndown of the catalytic steam reformer.

BRIEF SUMMARY

The present invention relates to a hydrogen production method which integrates a catalytic steam reformer and a gasifier.

The hydrogen production method comprises generating hydrogen in a gasifier thereby forming a gasifier effluent, and forming a hydrogen-containing mixture and a first adsorber feed from at least a portion of the gasifier effluent. The method further comprises introducing the hydrogen-containing mixture into a catalytic steam reformer at a first hydrogen-containing mixture volumetric flow rate and generating hydrogen in the catalytic steam reformer at a first hydrogen production rate thereby forming a catalytic steam reformer effluent. The method further comprises introducing the hydrogen-containing mixture into the catalytic steam reformer at a second hydrogen-containing mixture flow rate and generating hydrogen in the catalytic steam reformer at a second hydrogen production rate. The second hydrogen production rate is less than the first hydrogen production rate and the second hydrogen-containing mixture volumetric flow rate is greater than the first hydrogen-containing mixture volumetric flow rate. The first hydrogen-containing mixture volumetric flow rate may be zero.

The second hydrogen production rate may be 5% to 50%, or 5% to 40%, or 5% to 25%, or 5% to 15% of the first hydrogen production rate.

The second hydrogen-containing mixture volumetric flow rate may be 25% to 150% of the second hydrogen production rate.

The second hydrogen-containing mixture volumetric flow rate may be at least $1 \times 10^6$ normal cubic feet per day greater than the first hydrogen-containing mixture volumetric flow rate.

The step of forming the hydrogen-containing mixture and the first adsorber feed may comprise introducing the gasifier effluent into a first shift converter to form a first shift converter effluent from the gasifier effluent, taking a first portion of the first shift converter effluent for forming the hydrogen-containing mixture, and taking a second portion of the first shift converter effluent for forming the first adsorber feed.

The step of forming the hydrogen-containing mixture and the first adsorber feed may comprise introducing the gasifier effluent into a first shift converter to form a first shift converter effluent from the gasifier effluent, introducing the first shift converter effluent into an acid gas removal unit to form an acid gas removal unit effluent from the first shift converter effluent, taking a first portion of the acid gas removal unit effluent for forming the hydrogen-containing mixture, and taking a second portion of the acid gas removal unit effluent for forming the first adsorber feed.

The step of forming the hydrogen-containing mixture and the first adsorber feed may comprise introducing the gasifier effluent into an acid gas removal unit to form an acid gas removal unit effluent from the gasifier effluent, introducing the acid gas removal unit effluent into a first shift converter to form a first shift converter effluent from the acid gas removal unit effluent, taking a first portion of the first shift converter effluent for forming the hydrogen-containing mixture, and taking a second portion of the first shift converter effluent for forming the first adsorber feed.

The method may further comprise introducing the first adsorber feed into a first adsorber to form a first hydrogen product and a first desorption effluent, and introducing at least a portion of the first desorption effluent into the catalytic steam reformer as at least a portion of a catalytic steam reformer fuel.

The catalytic steam reformer fuel may consist essentially of the first desorption effluent.

The method may further comprise forming a second adsorber feed from at least a portion of the catalytic steam reformer effluent, introducing the second adsorber feed into a second adsorber thereby forming a second hydrogen product and a second desorption effluent, and introducing at least a portion of the second desorption effluent into the catalytic steam reformer as a second portion of the catalytic steam reformer fuel.

The method may further comprise forming a second adsorber feed from at least a portion of the catalytic steam reformer effluent, introducing the first adsorber feed and the second adsorber feed into a common adsorber to form a hydrogen product and a desorption effluent, and introducing at least a portion of the desorption effluent into the catalytic steam reformer as a portion of a catalytic steam reformer fuel.

The step of forming the second adsorber feed may comprise introducing the catalytic steam reformer effluent into a second shift converter to form a second shift converter effluent from the catalytic steam reformer effluent, and taking at least a portion of the second shift converter effluent for forming the second adsorber feed.

DETAILED DESCRIPTION

Figure 1:
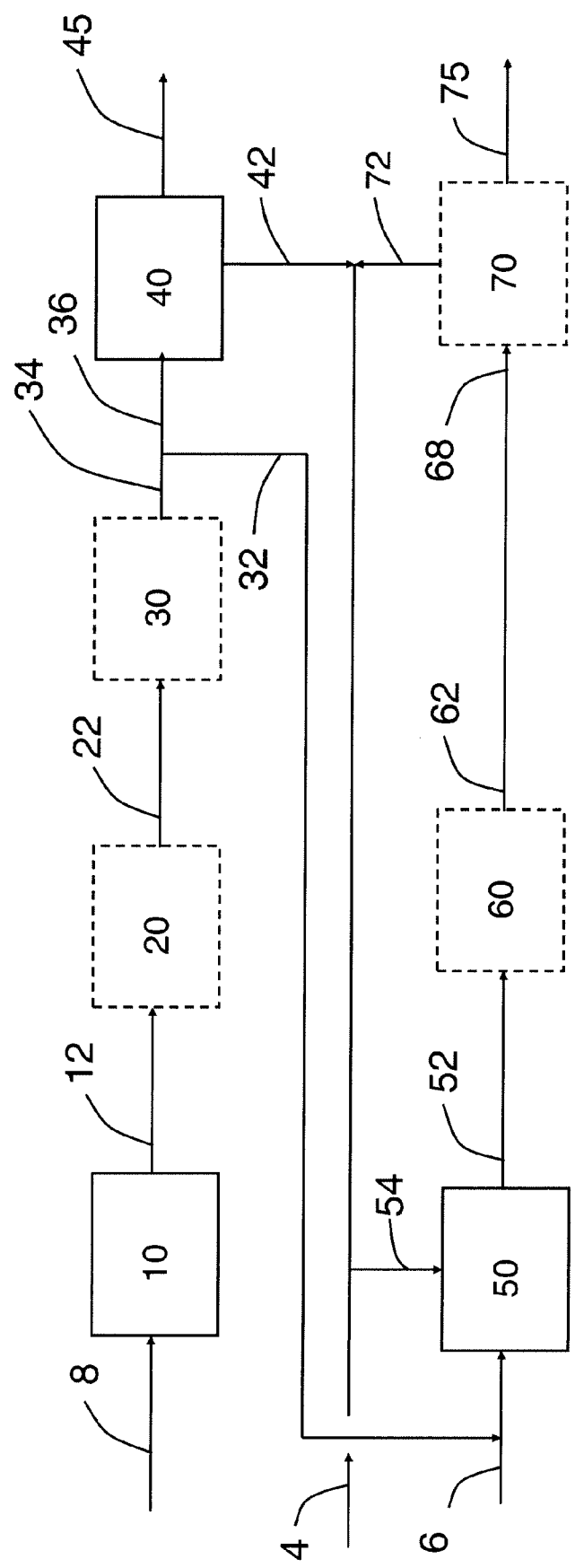
FIG. 1 is a schematic of a facility suitable for carrying out the method.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

For the purposes of simplicity and clarity, detailed descriptions of well-known devices, circuits, and methods are omitted so as not to obscure the description of the present invention with unnecessary detail.

The present invention relates to a hydrogen production method which integrates a catalytic steam reformer and a gasifier.

Catalytic steam reforming, also called steam methane reforming (SMR) or steam reforming, is defined as any process used to convert reformer feedstock to synthesis gas by reaction with steam over a catalyst. Synthesis gas, commonly called syngas, is a mixture comprising hydrogen and carbon monoxide.

A catalytic steam reformer, also called a steam methane reformer, is defined herein as any fired furnace used to convert feedstock containing elemental hydrogen and carbon to synthesis gas by a reaction with steam over a catalyst with heat provided by combustion of a fuel. Feedstock may be natural gas, methane, naphtha, propane, refinery offgas, or other suitable reformer feedstock. A catalytic steam reformer may have a plurality of catalyst-containing reformer tubes through which the reformer feed gas mixture is passed to form a reformed gas mixture comprising hydrogen. As used herein, plurality means at least two. Catalyst-containing reformer tubes have been loaded with suitable catalyst known in the art. Suitable catalysts for reforming reformer feedstock are known in the art. Suitable materials for making reformer tubes are known in the art. Suitable operating temperatures and pressures for a catalytic steam reformer are known in the art.

A gasifier, also called a partial oxidation reactor, is defined herein as any reactor in which the partial oxidation of a feedstock takes place, converting the feedstock into synthesis gas. Partial oxidation reactors are well known in the art, as are the partial oxidation reaction conditions. See, for example, U.S. Pat. Nos. 4,328,006, 4,959,080 and 5,281,243, all incorporated herein by reference. The feedstock of a gasifier is reacted with an oxygen-containing gas, such as air, enriched air, or nearly pure oxygen, and a temperature modifier, such as water or steam, in a gasifier to produce the synthesis gas. The oxygen is used to partially oxidize the carbon in the feedstock into primarily carbon monoxide and hydrogen gas. The temperature modifier is used to control the temperature inside the gasifier. Together, the oxygen and the temperature modifier can impact the composition of the synthesis gas. The feedstock for the gasifier may be petroleum coke, bitumen or heavy oil from tar sands, coal or other suitable feedstock known in the art.

The method will be described with reference to FIG. 1.

The method comprises generating hydrogen in a gasifier 10 thereby forming a gasifier effluent 12. The method further comprises forming a hydrogen-containing mixture 32 and an adsorber feed 36 from at least a portion of the gasifier effluent 12. The hydrogen-containing mixture 32 may be taken from any location downstream of the gasifier 10. Feed stream 8 comprises gasifier feedstock, oxidant, and water or steam.

Forming may include a combination of various steps, for example, mixing, reacting, heating, cooling, compressing, expanding, throttling, separating, etc. A mixture is formed from a first gas and a second gas if the mixture comprises one or more elemental constituents from the first gas and one or more elemental constituents from the second gas. For example, a mixture comprising elemental carbon and/or elemental hydrogen from a methane-containing first gas and elemental hydrogen and/or elemental oxygen from a water-containing second gas is formed from the methane-containing first gas and the water-containing second gas. The mixture may comprise the element carbon and element hydrogen as methane from the methane-containing first gas and the element hydrogen and the element oxygen as water from the water-containing second gas. Or the methane-containing first gas and the water-containing second gas may be reacted so that the mixture comprises the element carbon from the methane-containing first gas and element oxygen from the water-containing second gas as carbon dioxide.

A first mixture is formed from a second mixture if the first mixture comprises one or more elemental constituents from the second mixture. For example, a first mixture comprising elemental carbon, elemental hydrogen, and elemental oxygen as carbon dioxide and hydrogen may be formed from via a shift reaction of a second mixture comprising elemental carbon, elemental hydrogen and elemental oxygen as carbon monoxide and water.

The step of forming hydrogen-containing mixture 32 and adsorber feed 36 may comprise introducing gasifier effluent 12 into shift converter 20 to form shift converter effluent 22 from gasifier effluent 12, introducing shift converter effluent 22 into acid gas removal unit 30 to form acid gas removal unit effluent 34 from shift converter effluent 22, taking a first portion of acid gas removal unit effluent 34 for forming the hydrogen-containing mixture 32, and taking a second portion of acid gas removal unit effluent 34 for forming adsorber feed 36.

A shift converter may comprise one or more shift reactors in parallel or in series each containing various shift catalysts, each active in different temperature ranges. Suitable arrangements of high temperature shift, medium temperature shift, and low temperature shift may be used and may be determined without undue experimentation.

Alternatively, the step of forming the hydrogen-containing mixture 32 and adsorber feed 36 may comprise introducing gasifier effluent 12 into shift converter 20 to form shift converter effluent 22 from the gasifier effluent 12, taking a first portion of shift converter effluent 22 for forming the hydrogen-containing mixture, and taking a second portion of shift converter effluent 22 for forming adsorber feed 36. The first portion of the shift converter effluent may be passed to acid gas removal unit 30. The second portion of the shift converter effluent may be passed to another acid gas removal unit (not shown).

A shift reactor is defined as any device where carbon monoxide reacts with water to form hydrogen and carbon dioxide in the presence of a catalyst. Any suitable shift reactor may be used and may be selected without undue experimentation. Shift reactors are well known in the art.

An acid gas removal unit is any device or system for removing at least a portion of the carbon dioxide and hydrogen sulfide, if present. Acid gas removal units are well known in the art, for example, amine gas treating, the Selexol process (licensed by UOP LLC), and the Rectisol process (licensed by Lurgi AG).

Amine gas treating refers to a group of processes that use aqueous solutions of various amines to remove hydrogen sulfide and carbon dioxide from gases. It is a common unit process used in refineries, petrochemical plants, natural gas processing plants and other industries. Various amines may be used, for example, monoethanolamine (MEA), diethanolamine (DEA), methyl diethanolamine (MDEA), diisopropylamine (DIPA), and diglycolamine (DGA).

Selexol, and Rectisol are physical solvents that dissolves (absorbs) the acid gases from the gas. The Selexol solvent is a mixture of the dimethyl ethers of polyethylene glycol. Rectisol uses methanol as the solvent.

One skilled in the art may readily select a suitable acid gas removal unit.

Shift converter 20 may precede acid gas removal unit 30, as shown, or acid gas removal unit 30 may precede the shift converter 20.

The method further comprises introducing hydrogen-containing mixture 32 into catalytic steam reformer 50 at a first hydrogen-containing mixture volumetric flow rate and generating hydrogen in catalytic steam reformer 50 at a first hydrogen production rate thereby forming catalytic steam reformer effluent 52. The first hydrogen production rate may correspond to about the full production rate or design production rate. Full production may be required prior to commissioning a gasifier or during repair or routine maintenance of a gasifier. For the purposes of this disclosure, the hydrogen production rate is the volumetric flow rate of hydrogen leaving the catalytic steam reformer. The volumetric flow rate of hydrogen may be determined based on a measurement of the hydrogen mole fraction and the total volumetric flow rate.

The first hydrogen-containing mixture volumetric flow rate may be zero. There may be no flow of the hydrogen-containing mixture as a feed into the catalytic steam reformer at the first hydrogen production rate. The first hydrogen production rate may correspond to a condition where the gasifier is not yet on-stream and therefore no hydrogen-containing mixture is available.

Feed 6 comprising steam and catalytic steam reformer feedstock, separately or as a mixed feed, are introduced into catalytic steam reformer 50. All or part of catalytic steam reformer fuel 54 may be provided by fuel stream 4. Catalytic steam reformer fuel 54 is introduced into the catalytic steam reformer to provide heat by combustion of the fuel. Fuel 4 may be the same as the feedstock for feed 6, e.g. natural gas. Various other combustible streams may be used to form catalytic steam reformer fuel 54 to provide heat by combustion. The various streams may be added together or separately.

The method further comprises introducing hydrogen-containing mixture 32 into catalytic steam reformer 50 at a second hydrogen-containing mixture flow rate and generating hydrogen in catalytic steam reformer 50 at a second hydrogen production rate. The second hydrogen production rate is less than the first hydrogen production rate and may correspond to turndown or deep turndown conditions. The second hydrogen production rate may be 5% to 50% or 5% to 40%, or 5% to 25%, or 5% to 15% of the first hydrogen production rate.

The method is characterized by a greater volumetric flow rate of the hydrogen-containing mixture 32 into catalytic steam reformer 50 when generating hydrogen in catalytic steam reformer 50 at the lesser second hydrogen production rate than when generating hydrogen in catalytic steam reformer 50 at the greater first hydrogen production rate. The second hydrogen production rate is less than the first hydrogen production rate and the second hydrogen-containing mixture volumetric flow rate is greater than the first hydrogen-containing mixture volumetric flow rate.

Hydrogen-containing mixture 32 may be introduced into catalytic steam reformer 50 along with the feedstock and steam to generate hydrogen by the reforming reaction over a reformer catalyst.

The second hydrogen-containing mixture volumetric flow rate may be 25% to 150% of the second hydrogen production rate. The greater volumetric flow rate may be at least $1 \times 10^6$ normal cubic feet per day greater than the first hydrogen-containing mixture volumetric flow rate. Normal conditions are 1 atmosphere pressure and 32° F.

The method may comprise one or more of the following characteristics, taken alone or in any possible technical combinations.

The method may further comprise introducing adsorber feed 36 into adsorber 40 to form hydrogen product 45 and desorption effluent 42 and introducing at least a portion of desorption effluent 42 into the catalytic steam reformer 50 as at least a portion of catalytic steam reformer fuel 54. Desorption effluent 42 may provide some or all of the catalytic steam reformer fuel. Adsorber 40 may be any suitable adsorption type system, for example, a pressure swing adsorption system (PSA) or a vacuum swing adsorption system (VSA). Adsorbers are known in the art. The adsorber may comprise multiple vessels containing one or more adsorbent materials suitable for hydrogen separation.

Desorption effluent is commonly called tail gas. Desorption effluent is any gas withdrawn from the adsorber system during desorption of an adsorber bed, for example during purge and/or blowdown.

The catalytic steam reformer fuel may consist essentially of desorption effluent downstream of a gasifier, meaning that at least 95 volume % of the catalytic steam reformer fuel is desorption effluent from an adsorber that processes effluent from a gasifier.

The method may further comprise forming adsorber feed 68 from at least a portion of catalytic steam reformer effluent 52, introducing adsorber feed 68 into adsorber 70 thereby forming hydrogen product 75 and desorption effluent 72, and introducing at least a portion of desorption effluent 72 into catalytic steam reformer 50 as another portion of catalytic steam reformer fuel 54.

The step of forming adsorber feed 68 may comprise introducing catalytic steam reformer effluent 52 into shift converter 60 to form shift converter effluent 62 from the catalytic steam reformer effluent 52, and taking at least a portion of shift converter effluent 62 for forming adsorber feed 68.

The catalytic steam reformer fuel may consist essentially of desorption effluent 42 and desorption effluent 72 meaning that at least 95 volume % of the catalytic steam reformer fuel is desorption effluent from an adsorber that processes effluent from a gasifier and desorption effluent from an adsorber that processes effluent from a catalytic steam reformer.

Shift converter 60 may comprise one or more vessels containing various shift catalysts, each active in different temperature ranges.

The method may further comprise introducing catalytic steam reformer effluent 52 into shift converter 60 to form shift converter effluent 62 from catalytic steam reformer effluent 52, introducing shift converter effluent 62 into adsorber 70 thereby forming hydrogen product 75 and desorption effluent 72, and introducing at least a portion of desorption effluent 72 into catalytic steam reformer 50 as a portion of a catalytic steam reformer fuel 54.

The gasifier and the reformer may use a common adsorber. The method may further comprise forming adsorber feed 68 from at least a portion of catalytic steam reformer effluent 52, introducing the adsorber feed 36 and adsorber 68 into a common adsorber to form hydrogen product and desorption effluent, and introducing at least a portion of the desorption effluent into the catalytic steam reformer as a portion of catalytic steam reformer fuel.

The step of forming adsorber feed 68 may comprise introducing catalytic steam reformer effluent 52 into shift converter 60 to form shift converter effluent 62 from the catalytic steam reformer effluent 52, taking at least a portion of shift converter effluent 62 to form adsorber feed 68.

The method may employ various heat recovery schemes. Heat recovery from catalytic steam reformers and shift reactors are well-known in the art.

EXAMPLE

Several simulations were carried out to show the benefit of the present method.

Table 1 provides an estimate of how much natural gas can be saved by using the present method. The values shown in the column for the design case presents the estimate of how much natural gas feed and fuel are consumed to operate the catalytic steam reformer (SMR) producing $165 \times 10^6$ standard cubic feet per day of hydrogen. The values shown in the column for turndown—100% nat. gas feed shows an estimate of how much natural gas feed and fuel are consumed to operate the catalytic steam reformer to produce only $33 \times 10^6$ standard cubic feet per day of hydrogen, representing a turndown to 20% of the design production rate.

The values in the column for turndown—gasifier hydrogen-containing mixture import with no PSA tail gas import show the estimated natural gas feed and fuel consumption associated with the use of $25 \times 10^6$ standard cubic feet per day of hydrogen-containing gas mixture from the gasifier as a portion of the catalytic steam reformer feed. Although the gross hydrogen production rate is reduced slightly in this case from 33 to $30.5 \times 10^6$ standard cubic feet per day, the natural gas feedstock is reduced by 67%. The natural gas fuel stream is also reduced by almost 10%.

Hydrogen-containing mixture import values are higher heating values (HHV). Natural gas consumption values are higher heating values (HHV). Reformer firing values are lower heating values (LHV).

The assumed concentration for the hydrogen-containing mixture from the gasifier was 93.0% $H_2$, 2.0% $CO_2$, 4.2% CO, 0.1% $CH_4$, 0.2% Ar, 0.3% $N_2$, and 0.2% $H_2O$. This flow and composition results in a blended feed (including nat. gas feed) $H_2$ concentration of 80%. Percentages are on a volume basis.

While using some of the hydrogen-containing mixture produced by the gasifier as feed to the turned down catalytic steam reformer will result in a higher gasifier feed rate, the significant natural gas saving in the catalytic steam reformer will more than offset the cost of the increased gasifier feedstock since the gasifier uses a low value feedstock.

Another benefit of this method is that the carbon dioxide emitted in the catalytic steam reformer stack gas is reduced.

The values in the column for turndown-gasifier hydrogen-containing mixture import with PSA tail gas import show the estimated natural gas feed and fuel consumption associated with the use of $25 \times 10^6$ standard cubic feet per day of hydrogen-containing gas mixture from the gasifier as a portion of the catalytic steam reformer feed. In addition, 47.5 MMBtu/h (based on lower heating value, LHV) of gasifier PSA tail gas is fired in the catalytic steam reformer. This has the benefit of reducing the catalytic steam reformer natural gas trim fuel by 43%. This method will also further reduce carbon dioxide emissions from the catalytic steam reformer.

Another potential benefit of this method is that an acceptable PSA tail gas firing duty turndown ratio can be maintained in the catalytic steam reformer burners. In the example presented, without tail gas import from the gasifier PSA, an SMR tail gas burner turndown ratio of at least 8:1 would be required. This can be reduced to a ratio of 6:1 with tail gas import, simplifying the burner design.

The amount of export steam available using the method is reduced.

TABLE 1

| | | Design Case | Turndown 100% Nat. gas feed | Turndown - Gasifier hydrogen-containing mixture import | |
|---|---|---|---|---|---|
| | | | | No PSA tail gas import | PSA tail gas import |
| H2 Production | | | | | |
| Gross Generation | MMSCFD | 165 | 33 | 30.5 | 30.5 |
| H2-containing mixture import from gasifier | MMSCFD | 0 | 0 | 25 | 25 |
| | MMBtu/h | 0 | 0 | 329 | 329 |
| Natural gas consumption | | | | | |
| Feed | lb · mols/h | 6979 | 1406 | 454 | 454 |
| | MMBtu/h | 2653 | 535 | 173 | 173 |
| Fuel | lb · mols/h | 1082 | 390 | 353 | 201 |
| | MMBtu/h | 411 | 148 | 134 | 76 |
| Total | lb · mols/h | 8061 | 1797 | 807 | 655 |
| | MMBtu/h | 3065 | 683 | 307 | 249 |
| Export Steam | | | | | |
| Pressure | psig | 610 | 610 | 610 | 610 |
| Temperature | ° F. | 775 | 804 | 783 | 776 |
| Flow rate | lb/h | 315670 | 36850 | 28684 | 24748 |
| Reformer firing | | | | | |
| Trim fuel | MMBtu/h | 371 | 134 | 121 | 69 |
| Total PSA tail gas (incl. imported | MMBtu/h | 902 | 187 | 112 | 160 |
| Imported PSA tail gas | MMBtu/h | 0 | 0 | 0 | 48 |
| Total | MMBtu/h | 1273 | 321 | 233 | 229 |

Although the present invention has been described as to specific embodiments or examples, it is not limited thereto, but may be changed or modified into any of various other forms without departing from the scope of the invention as defined in the accompanying claims.

We claim:

1. A hydrogen production method comprising:
   generating hydrogen in a gasifier thereby forming a gasifier effluent;
   forming a hydrogen-containing mixture and a first adsorber feed from at least a portion of the gasifier effluent;
   introducing steam, catalytic reformer feedstock, and optionally the hydrogen-containing mixture into a catalytic steam reformer and generating hydrogen in the catalytic steam reformer at a first hydrogen production rate thereby forming a catalytic steam reformer effluent, wherein the hydrogen-containing mixture is introduced at a first hydrogen-containing mixture volumetric flow rate which may be zero; and
   introducing steam, catalytic reformer feedstock, and the hydrogen-containing mixture into the catalytic steam reformer and generating hydrogen in the catalytic steam reformer at a second hydrogen production rate, wherein the hydrogen-containing mixture is introduced at a second hydrogen-containing mixture volumetric flow rate;
   wherein the second hydrogen production rate is 5% to 50% of the first hydrogen production rate and wherein the second hydrogen-containing mixture volumetric flow rate is greater than the first hydrogen-containing mixture volumetric flow rate, such that there is a greater volumetric flow rate of the hydrogen-containing mixture into the catalytic steam reformer when generating hydrogen in the catalytic steam reformer at the lesser, second hydrogen production rate than when generating hydrogen in the catalytic steam reformer at the greater, first hydrogen production rate.

2. The method of claim 1 wherein the second hydrogen production rate is 5% to 25% of the first hydrogen production rate.

3. The method of claim 1 wherein the second hydrogen-containing mixture volumetric flow rate is 25% to 150% of the second hydrogen production rate.

4. The method of claim 1 wherein the second hydrogen-containing mixture volumetric flow rate is at least $1 \times 10^6$ normal cubic feet per day greater than the first hydrogen-containing mixture volumetric flow rate.

5. The method of claim 1 wherein the step of forming the hydrogen-containing mixture and the first adsorber feed comprises:
   introducing the gasifier effluent into a first shift converter to form a first shift converter effluent from the gasifier effluent;
   taking a first portion of the first shift converter effluent for forming the hydrogen-containing mixture; and
   taking a second portion of the first shift converter effluent for forming the first adsorber feed.

6. The method of claim 5 further comprising:
   introducing the first adsorber feed into a first adsorber to form a first hydrogen product and a first desorption effluent; and
   introducing at least a portion of the first desorption effluent into the catalytic steam reformer as at least a portion of a catalytic steam reformer fuel.

7. The method of claim 1 wherein the step of forming the hydrogen-containing mixture and the first adsorber feed comprises:
   introducing the gasifier effluent into a first shift converter to form a first shift converter effluent from the gasifier effluent;
   introducing the first shift converter effluent into an acid gas removal unit to form an acid gas removal unit effluent from the first shift converter effluent;
   taking a first portion of the acid gas removal unit effluent for forming the hydrogen-containing mixture; and taking a second portion of the acid gas removal unit effluent for forming the first adsorber feed.

8. The method of claim 7 further comprising:
introducing the first adsorber feed into a first adsorber to form a first hydrogen product and a first desorption effluent; and
introducing at least a portion of the first desorption effluent into the catalytic steam reformer as at least a portion of a catalytic steam reformer fuel.

9. The method of claim 1 wherein the step of forming the hydrogen-containing mixture and the first adsorber feed comprises:
introducing the gasifier effluent into an acid gas removal unit to form an acid gas removal unit effluent from the gasifier effluent;
introducing the acid gas removal unit effluent into a first shift converter to form a first shift converter effluent from the acid gas removal unit effluent;
taking a first portion of the first shift converter effluent for forming the hydrogen-containing mixture; and
taking a second portion of the first shift converter effluent for forming the first adsorber feed.

10. The method of claim 1 further comprising:
introducing the first adsorber feed into a first adsorber to form a first hydrogen product and a first desorption effluent; and
introducing at least a portion of the first desorption effluent into the catalytic steam reformer as at least a portion of a catalytic steam reformer fuel.

11. The method of claim 10 wherein the catalytic steam reformer fuel consists essentially of the first desorption effluent.

12. The method of claim 10 further comprising:
forming a second adsorber feed from at least a portion of the catalytic steam reformer effluent;
introducing the second adsorber feed into a second adsorber thereby forming a second hydrogen product and a second desorption effluent; and
introducing at least a portion of the second desorption effluent into the catalytic steam reformer as a second portion of the catalytic steam reformer fuel.

13. The method claim 1 further comprising:
forming a second adsorber feed from at least a portion of the catalytic steam reformer effluent;
introducing the first adsorber feed and the second adsorber feed into a first adsorber to form a hydrogen product and a desorption effluent; and
introducing at least a portion of the desorption effluent into the catalytic steam reformer as a portion of a catalytic steam reformer fuel.

14. The method of claim 13 wherein the step of forming the second adsorber feed comprises:
introducing the catalytic steam reformer effluent into a second shift converter to form a second shift converter effluent from the catalytic steam reformer effluent; and
taking at least a portion of the second shift converter effluent for forming the second adsorber feed.

* * * * *